United States Patent Office 3,006,126
Patented Oct. 31, 1961

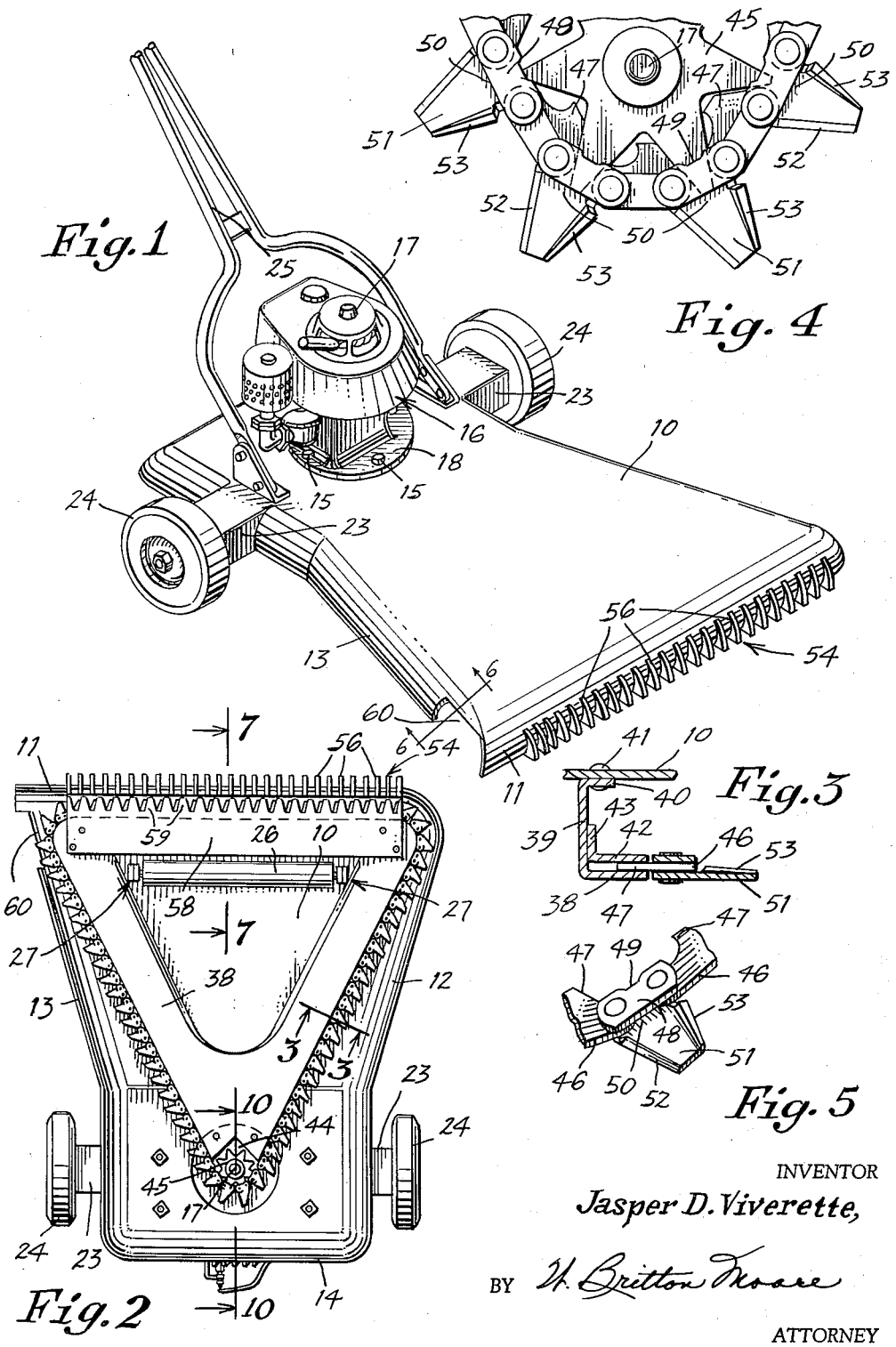

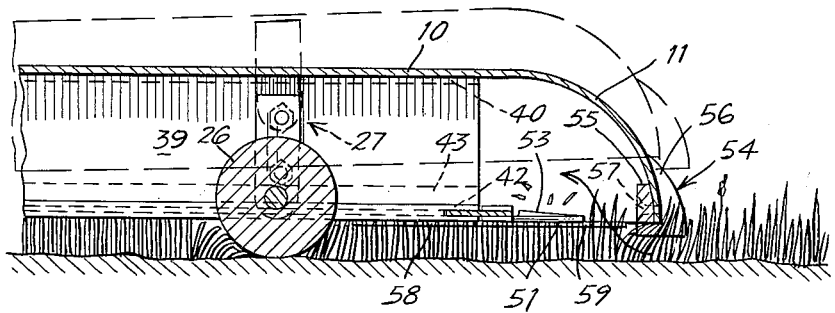
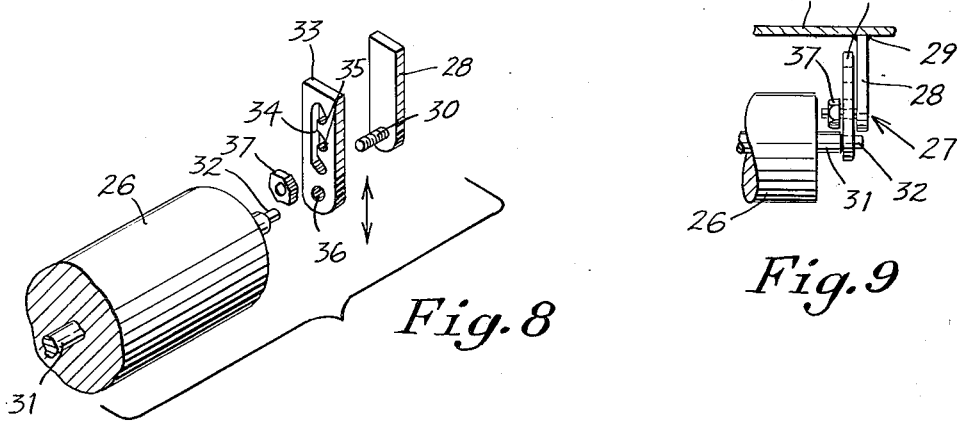
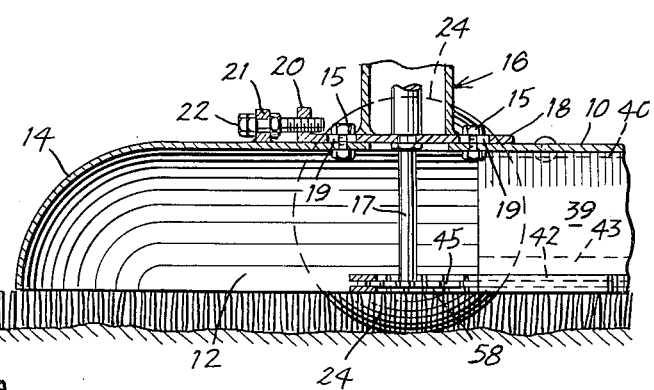

3,006,126
POWER DRIVEN CHAIN CUTTER LAWN MOWER
Jasper D. Viverette, P.O. Box 277, Sharpsburg, N.C.
Filed July 7, 1960, Ser. No. 41,435
8 Claims. (Cl. 56—25)

The present invention relates to a power driven chain cutter lawn mower and it consists in the combinations, constructions and arrangements of parts hereinafter described and claimed.

Generally there is provided a power driven chain cutter lawn mower having a generally horizontally extending casing with dependent side walls and supported adjacent its rear end by a pair of ground contacting support wheels. A novel roller supports the forward portion of the casing and has novel means for its vertical adjustment with respect to the casing thus providing at the same time means for varying the height of the cut of grass with which the apparatus is used. A pair of vertically spaced guide plates is mounted in spaced relation to the underside of the casing and presents one of its straight edge portions in parallel relation to the forward edge of the casing. An endless chain-type cutter is entrained over a series of gears one of which is mounted at each of the apex portions of the triangular plates. The guide plates and blades are so arranged that one of the straight sides of the triangular arrangement is in parallel relation to the forward dependent edge of the casing, in that side thereof toward which the teeth of the cutter are adapted to move. The teeth of the cutter are provided with a novel air-impelling portion in each case so that a continual volume of air is moved outwardly through the side opening of the casing thus providing a partial vacuum beneath the casing which causes grass to be cut by the device to be raised through such novel air movement. Novel means is provided for guiding the chain cutter and for adjusting the tensioning of the same. Other novel features will be noted in the appended specification.

It is accordingly an object of the invention to provide a device of the character set forth which is simple in construction, inexpensive to manufacture and yet effective and efficient in use.

Another object of the invention is to provide a novel endless chain type blade which forms a part of the invention.

Another object of the invention is to provide, in a device of the character set forth, a novel air-impelling portion for a novel blade forming a part of the invention.

Still another object of the invention is to provide, in a device of the character set forth, a novel supporting roller and novel means for adjusting the same with respect to a casing likewise forming a part of the invention.

Still another object of the invention is to provide, in a device of the character set forth, novel air-operated means for raising grass to substantially vertical position prior to cutting the same.

Another object of the invention is to provide, in a device of the character set forth, a novel guard member forming a part of the invention.

A still further object of the invention is to provide, in a device of the character set forth, novel guide members forming a part of an endless chain type cutter likewise forming a part of the invention.

Other and further objects of the invention will become apparent from a reading of the following specification taken in conjunction with the drawings, in which:

FIGURE 1 is a perspective view of a lawn mower in accordance with the present invention, FIGURE 2 is a bottom plan view thereof, FIGURE 3 is an enlarged fragmentary sectional view taken along line 3—3 of FIGURE 2, FIGURE 4 is an enlarged fragmentary plan view illustrating certain details of construction, FIGURE 5 is a fragmentary perspective view of a blade forming a part of the invention, FIGURE 6 is an enlarged fragmentary vertical sectional view taken substantially along line 6—6 of FIGURE 1, and illustrating further details of construction, FIGURE 7 is an enlarged fragmentary sectional view taken substantially along line 7—7 of FIGURE 2, FIGURE 8 is a fragmentary exploded perspective view illustrating adjusting means for a roller forming a part of the invention, FIGURE 9 is a fragmentary sectional view illustrating the mounting of the roller above referred to, and FIGURE 10 is an enlarged fragmentary sectional view taken substantially along line 10—10 of FIGURE 2.

Referring more particularly to the drawings, there is shown therein a lawn mower of the character set forth having a generally horizontally extending casing 10 having an integrally formed forwardly and downwardly extending front wall 11, rearwardly and inwardly extending dependent side walls 12 and 13 and integrally formed dependent rear wall 14.

Mounted atop the casing 10 by bolts 15 or the like is a motor generally indicated at 16 and preferably of the internal combustion type. The motor is provided with a vertical drive shaft 17. The motor is also provided with a base 18 having a plurality of longitudinal slots 19 through which the bolts 15 extend to fasten the same to the casing 10. The rearward end of the base 18 has integrally formed a vertically extending dog 20 and the casing 10 has affixed thereto a vertically extending dog 21 in adjacent spaced relation to the dog 20. An adjusting bolt 22 extends freely through the dog 21 and is threadably engaged with the dog 20.

A mounting member 23 is affixed to each side of the casing 10 adjacent the rear thereof and a supporting wheel 24 is carried by each of the mountings 23 and a conventional forked handle 25 is likewise affixed to the mountings 23.

A transversely extending ground-engaging roller 26 is adjustably connected with the underside of the casing 10 by a pair of adjustable supports generally indicated at 27 and shown in detail in FIGURES 8 and 9.

Each of the supports 27 consists of a vertically dependent arm 28 affixed by welding 29 or the like to the underside of the casing 10 and having affixed to its lower end an inwardly extending threaded bolt 30. The roller 26 is provided with an axle 31 having reduced end portions, as indicated at 32. An intermediate plate 33 is provided with a vertical slot 34 having a series of notches 35 communicating therewith and provided at its lower end with a circular opening 36. A nut 37 is provided for the bolt 30.

A lower guide plate 38 of triangular shape is provided with an upstanding wall 39 at its outer edge and the wall 39 terminates in an inturned flange 40 which is affixed to the casing 10 by rivets 41 or the like. An upper guide plate 42 is provided with an integrally formed upturned outer wall 43 which is affixed to the inner face of the wall 39 by welding or the like.

The rearmost apex portions of the guide plates 38 and 42 are cut away, as indicated at 44 in FIGURE 2 to provide space for a drive gear 45 mounted upon the end of the shaft 17.

An endless chain type cutter is provided and consists of intermediate links 46 having integrally formed inwardly extending guide arms 47. The intermediate links are interconnected by upper links 48 each having a centrally disposed indented portion 49 in the rear face thereof. The intermediate links 46 are also connected by a lower link member 50 having in each case an outwardly extending integrally formed blade 51 one edge of which is sharpened, as indicated at 52 and the other end of which is angularly upturned, as indicated at 53.

A guard member is generally indicated at 54 and is provided with a backing member 55 and a plurality of laterally spaced teeth 56 which are connected at their lower ends to the lower end of the backing member 55. The teeth 56 are curved upwardly and rearwardly to conform with the curvature of the wall 11 and their rearward faces are spaced sufficiently from the plate 55 to allow the insertion of the lower edge portion of the wall 11 between the teeth and the plate 55, the latter being held removably in position upon the wall 11 by set screws 57 or the like.

A fixed blade 58 is attached to the underside of the forward portion of the guide plate 38 and is provided with forwardly extending substantially triangular teeth 59.

In operation, it will be apparent that the endless chain cutter is moved continuously in one direction with the forward flight thereof moving to the left as viewed in FIGURE 2, the motion being supplied, of course, by the motor 16 operating through the drive shaft 17 and gear 45, the latter being enmeshed with the endless cutter as indicated in FIGURE 4, it being apparent that the teeth of the gear 45 engage the endless cutter between the links 48 and 50 and adjacent intermediate links 46.

It will be apparent that the members 47 extend inwardly between the guide plates 38 and 42 to thus hold the endless cutter in proper alignment at all times. In order to tension the endless cutter upon the plates 38 and 42, it is only necessary to loosen the bolts 15 and to thereafter rotate the bolt 22 to thus move the plate 18 forwardly or rearwardly as required and, when proper tensioning has been attained to thereafter again tighten the bolts 15.

As the blades 51 move to the left as viewed in FIGURE 2, it will be seen that the wing portions or vanes 53 will act to move air from within the casing 10 through an opening 60 provided in the forward portion of the side wall 13. This action will cause a partial vacuum beneath the casing 10 thus causing air to be drawn between the ground and the lower edges of the various side walls. This action will cause a continuous flow of air from beneath the casing 10 outwardly through the opening 60 thus dispensing cut grass rapidly through the opening 60.

In order to raise or lower the cooperating cutting blades 51 and 59 with respect to the ground over which the device is passing, the supporting roller 26 may be adjusted with respect to the casing 10. This is accomplished by loosening the nut 37 and thereafter moving the bolt 30 relatively to the member 33 by moving the same through the slot 34 to another selected notch 35 after which the nut may again be tightened in the newly selected position. This raising or lowering of the roller 26 will cause a like raising or lowering of the cutting blades, as indicated in full and dotted lines in FIGURE 7.

It will also be understood that the motor 16, instead of the conventional internal combustion engine, may be an electric motor which may be either the A.C. or D.C. type supplied with electrical current by a flexible line or may be an electric motor supplied with current from a battery mounted on or within the casing 10.

While but one form of the invention has been shown and described herein, it will be readily apparent to those skilled in the art that many minor modifications may be made without departing from the spirit of the invention or the scope of the appended claims.

What is claimed is:

1. A lawn mower of the character described comprising a generally horizontally extending open bottom housing having a grass discharge opening in the forward portion of one side thereof, said housing having a straight laterally extending downwardly curved front wall, an endless cutter having a series of blades mounted for movement in a horizontal plane in said housing, a flat cutter bar mounted in said housing in parallel spaced relation to the forward wall of said housing, said endless cutter having one portion thereof in constant contact with said cutter bar, means driving said endless cutter, ground-engaging wheels supporting the rear portion of said housing, and a ground-engaging roller carried by said housing and supporting the forward portion thereof.

2. A lawn mower of the character described comprising a generally horizontally extending open bottom housing having a grass discharge opening in the forward portion of one side thereof, said housing having a straight laterally extending downwardly curved front wall, an endless cutter having a series of blades mounted for movement in a horizontal plane in said housing, a flat cutter bar mounted in said housing in parallel spaced relation to the forward wall of said housing, said endless cutter having one portion thereof in constant contact with said cutter bar, means driving said endless cutter, ground-engaging wheels supporting the rear portion of said housing, and a ground-engaging roller carrier by said housing and supporting the forward portion thereof, said roller being vertically adjustably connected to the underside of said housing whereby the height of grass cut by said mower may be controlled.

3. A device as defined in claim 1 wherein each of said series of blades is provided with an angularly upturned vane whereby air is constantly directed toward said discharge opening to forcibly discharge cut grass from said housing.

4. A device as defined in claim 1 wherein each of said series of blades is provided with an angularly upturned vane whereby air is constantly directed toward said discharge opening to forcibly discharge cut grass from said housing, and wherein said roller is vertically adjustably connected to said housing whereby the height of grass cut by said mower may be controlled.

5. A lawn mower of the character described comprising a generally horizontally extending open bottomed housing having a grass discharge opening in the forward portion of one side thereof, said housing having a straight laterally extending downwardly curved front wall, a pair of vertically spaced horizontally extending guide plates of generally triangular shape mounted in said housing, an endless cutter having a series of outwardly extending blades and a series of inwardly extending guide arms, said guide arms extending slidably between said guide plates whereby said plates support said endless cutter, a flat cutter bar mounted in said housing in parallel spaced relation to the forward wall of said housing, said endless cutter having the blades of one portion thereof in constant contact with said cutter bar, means driving said endless cutter, ground-engaging wheels supporting the rear portion of said housing, and a ground-engaging roller connected to said housing and supporting the forward portion thereof.

6. A lawn mower of the character described comprising a generally horizontally extending open bottomed housing having a grass discharge opening in the forward portion of one side thereof, said housing having a straight laterally extending downwardly curved front wall, a pair of vertically spaced horizontally extending guide plates of generally triangular shape mounted in said housing, an endless cutter having a series of outwardly extending blades and a series of inwardly extending guide arms, said guide arms extending slidably between said guide plates whereby said plates support said endless cutter, a flat cutter bar mounted in said housing in parallel spaced relation to the forward wall of said housing, said endless cutter having the blades of one portion thereof in constant contact with said cutter bar, means driving said endless cutter, ground-engaging wheels supporting the rear portion of said housing, and a ground-engaging roller connected to said housing and supporting the forward portion thereof, said roller being vertically adjustably connected to the underside of said housing whereby the height of grass cut by said mower may be controlled.

7. A device as defined in claim 5 wherein a guard member having a series of laterally spaced teeth is removably affixed to the front wall of said housing.

8. A device as defined in claim 7 wherein said means for moving said endless cutter comprises a motor slidably mounted for longitudinal movement on the rear portion of said housing, a drive shaft for said motor extending vertically through said housing, a driving gear mounted on said shaft within said housing and engaging said endless cutter whereby to drive the same, and bolts affixing the motor in selected position upon said housing whereby to control the tension of said endless cutter.

References Cited in the file of this patent
UNITED STATES PATENTS
571,904    Lankford _____ Nov. 24, 1896